Patented Sept. 22, 1942

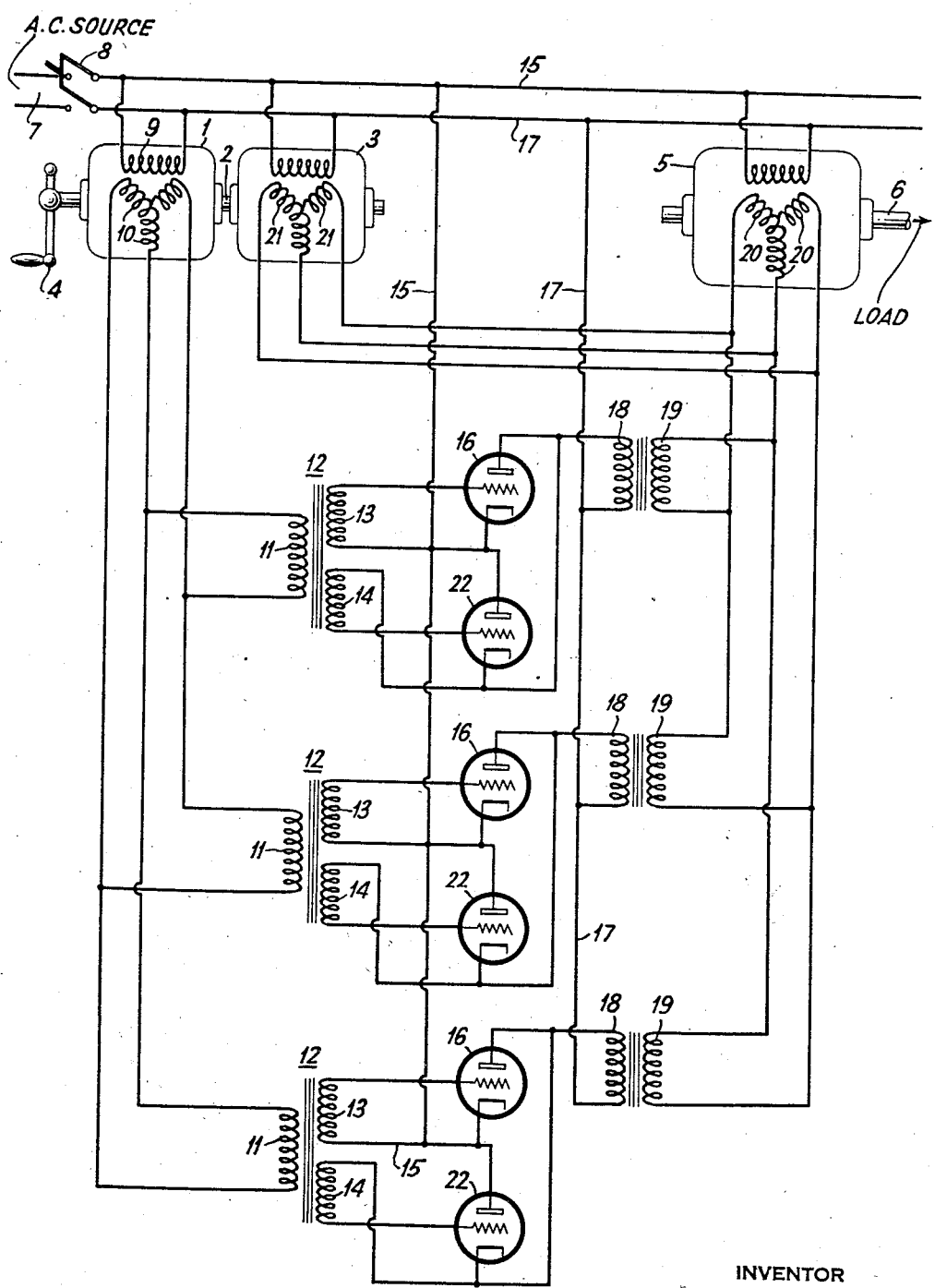

2,296,436

UNITED STATES PATENT OFFICE 2,296,436

SYSTEM FOR TRANSMITTING ANGULAR MOTION

De Witt Rugg Goddard, Riverhead, N. Y., assignor to Radio Corporation of America, a corporation of Delaware Application January 22, 1941, Serial No. 375,376

7 Claims. (Cl. 172—239)

My invention relates to a system for the transmission of angular motion and has for its object the provision of means for amplifying the output of a transmitting motion device. My invention is particularly applicable to "Selsyn" motor systems, such as are commonly used as indicating devices to indicate to an operator the position or condition of some remotely controlled device. Such systems are also used to control small amounts of power at a remote point from the application of a like amount of power at the control point.

In known "Selsyn" motor systems the rotor of an electrical machine at the control end of the system may be provided with a hand wheel whereby the armature may be rotated into any angular position. The reactance between the stator and the rotor windings is caused to communicate three currents of different amplitude to similar windings in a remote electrical machine the rotor of which is similarly drawn into the same angular position as that of the control machine.

My invention has many applications, such as the remote operation of any mechanical device which requires a variable adjustment. Examples of such devices are radio antennas which require directional orientation, and rheostats which are variable between certain limiting values of adjustment, the rapid aiming from a remote point of one or more large heavy searchlights, or guns.

It is an object of my invention to provide a system of the class described wherein the turning of the "Selsyn" generator is aided by self-controlled amplified power so that the operator may feel the effects of this amplified power when he turns the hand wheel.

It is another object of my invention to provide means wherein the operator of a "Selsyn" generator in manipulating the hand wheel can tell whether or not the remotely controlled "Selsyn" motor is following.

It is another object of my invention to provide electrical means interconnecting the units of a "Selsyn" motor system such that the inertia of the driven unit will be applied in some degree as a restraint on the manual control of the driving unit.

Other objects and advantages of my invention will be made apparent in the following detailed description which is accompanied by a drawing, the sole figure of which represents an arrangement of parts which I prefer to employ in carrying out the invention.

Referring to the drawing, I show a control unit consisting of an electrical machine 1 the shaft 2 of which is connected to an auxiliary machine 3. On the end of the shaft 2 I preferably mount a hand wheel 4. At any remote point is a "Selsyn" motor 5 which may be of any suitable size for carrying a load such as a device the adjustment of which is to be obtained by angular motion of the motor shaft 6.

Either the stator or the rotor of each of the machines 1, 3 and 5 may be excited by a single phase winding, while the complementary element thereof is provided with a 3-phase winding. As shown in the figure, however, the single phase winding in each of these machines is connected to a suitable source of alternating current indicated at 7. Connection of this source to all three machines 1, 3 and 5 may be effected by means of a switch 8. The currents induced by the single phase primary winding 9 in the 3-phase windings 10 of the machine 1 are impressed on three separate primaries 11 of suitable transformers 12. The relative amplitudes of these currents will depend upon the angular position of the rotor 9 in the machine 1 with respect to the stator windings 10.

Each of the transformers 12 possesses two secondary windings 13 and 14 respectively. Considering the windings 13, they each have a terminal connected to one of the conductors 15 of the A. C. source. The other terminals of the secondary windings 13 are connected respectively to control grids in three power amplifier tubes 16. The cathodes of these tubes 16 are all connected to the A. C. conductor 15. The anodes, however, are supplied with opposite potentials from the other side of the A. C. circuit as shown at 17. Interposed between the anodes of the tubes 16 and the conductor 17 are three primary windings 18 of a 3-phase transformer system. The currents induced in the secondaries 19 of this system are connected in a conventional 3-conductor power supply line leading to the star-connected windings 20 of the "Selsyn" motor unit 5. In parallel with the windings 20 is another star-connected 3-phase winding 21 in the unit 3. This unit 3, as before mentioned, is mechanically connected to the generator unit 1 and serves to cooperate with the manual control of the latter so as to give the operator a due sense of the response to his control movement as applied to the hand wheel 4.

Referring back to the transformers 12, it will be noted that the secondary windings 14 are connected between the cathodes and grids of three power amplifier tubes 22 which serve to amplify the half cycles of alternating current intervening between the half cycles which are amplified by the tubes 16. Each of the tubes 22 has an anode connected to the A. C. source conductor 15, while the cathode is connected through its appropriate transformer winding 18 to the A. C. source conductor 17. The tubes 16 and 22, therefore, are rendered conductive alternately in accordance with the frequency of the A. C. source. The amplitude of the output energy derived from the tubes 16 and 22 in each circuit, however, depends upon the control energy which is induced across the transformers 12 from the 3-phase pickup coils 10 in the unit 1. The control potentials applied to the respective grids of the tubes 16 and 22 will, therefore, be variably related to one another depending on the position of the rotor in the generator 1.

As will be understood by those familiar with "Selsyn" motor drive systems, the relative current amplitudes in the different legs of the 3-phase star-connected windings 20 and 21 will determine the position which is assumed by the rotors in the two machines 3 and 5 respectively.

A principal advantage to be derived from the arrangement herein shown and described is that the operator of the hand wheel 4 is practically prevented from moving the wheel faster than the rotor in the machine 5 can be driven to a new position. In other words, the three currents induced in the driving coils 20 and 21 will enforce the maintenance of like angular movements on the shafts 2 and 6. The driving and driven units, therefore, are prevented from getting out of step. This would not be the case if the driven unit 5 were subject only to the action of the amplifier tubes 16 and 22 without the exercise of the functions performed by the follower unit 3. Thus, if the "Selsyn" motor 5 resists rotation because of the load which it carries, this resistance will be felt by the holding-back action of the unit 3 on the shaft 2 of the control unit operated by the hand wheel 4. In this case the unit 5 becomes a generator and causes the follower unit 3 to maintain a corresponding angular movement of its rotor.

Various modifications of the invention will suggest themselves to those skilled in the art in view of the foregoing description. Among these modifications it should be mentioned that the 3-phase windings 10, 20 and 21 may, if desired, be delta connected rather than star-connected.

It is also obvious that if the rotor carries the single phase windings in each of the machines 1, 3 and 5 then the stator in each of these machines will be of the 3-phase type. On the other hand, if desired, the rotor may carry the 3-phase windings while the stator is arranged to supply the single phase field. The first arrangement, however, appears preferable for the reason that only two slip rings are necessary in order to conduct the single phase current to the rotor, whereas with 3-phase windings on the rotor three slip rings will be required.

I claim:

1. A "Selsyn" drive arrangement comprising a transmitting unit and a receiving unit, each unit having a single phase winding, a polyphase winding and magnetic rotor and stator members supporting said windings, an auxiliary electrical unit having correspondig single phase and polyphase windings supported on magnetic rotor and stator members, means for mechanically intercoupling the rotors of said transmitting unit and said auxiliary unit, a source of alternating current connected to each of the single phase windings in said units, output circuits from the polyphase windings of said transmitting unit, means for amplifying the potentials across different pairs of conductors in said output circuits, and means for feeding the amplified potentials to the polyphase windings of said receiving unit and said auxiliary unit in such manner that the rotors therein are maintained in corresponding states of orientation.

2. An arrangement according to claim 1 wherein the amplifying means comprises at least three pairs of discharge tubes, each tube having at least a cathode, a control grid and an anode, and each pair being arranged with the cathode of one tube connected to the anode of the other tube, and vice versa, whereby full wave amplification of the applied potentials is obtained.

3. An arrangement according to claim 1 wherein a set of transformers is provided for feeding the output potentials from the polyphase windings of said control unit to said amplifying means, each of said transformers having a primary winding and two secondary windings.

4. An arrangement according to claim 1 wherein separate transformers are provided for feeding the amplified potentials across different pairs of terminals of the polyphase windings in said receiving unit.

5. A system for the remote control of angular motion of the rotor in an electrical machine, comprising a control device having an electromagnetic rotor orientable with respect to an electromagnetic stator field, means including a source of alternating current for producing reactance between the rotor and the stator, an output circuit from said control device having at least three conductors, means for separately amplifying the potentials across different pairs of said conductors, electromagnetic rotor and stator windings in the electrical machine to be remotely controlled, at least one of said windings being orientable with respect to the others and being directly energizable by said source of alternating current, means for feeding said amplified potentials to said other windings of said machine, and means for causing the mutual reactance between the rotor and stator windings of said machine to maintain a correspondence of orientation between its own rotor and the rotor of said control device.

6. In a system for the transmission of electrical energy between two electrical machines in such manner as to provide corresponding orientations of the rotors in said machines, where each machine comprises a single phase winding rotatively juxtaposed to a polyphase winding, apparatus for manipulation of one said machine to remotely control the other, said apparatus comprising means for energizing the single phase windings with alternating current thereby to induce currents of different amplitude in the polyphase windings, an amplifying system arranged to proportionately amplify the currents from the manipulated machine, means including connections from the output side of said amplifying system leading to the polyphase windings of the other machine producing a rotor torque in said other machine until a balance of reactances therein is obtained, and means for producing a corresponding rotor torque in the manipulated machine during an unbalance of said reactances, thereby to restrain the act of manipulation to a certain degree.

7. In a "Selsyn" system having transmitting and receiving units in each of which is a single-phase winding, a polyphase winding and a rotor for supporting one of said windings, apparatus for controlling the angular position of the rotor in the receiving unit by manipulation of the rotor in the transmitting unit, said apparatus including a single-phase power source and connections therefrom to each of said single-phase windings, a plurality of amplifiers each having an input circuit coupled across different legs of the polyphase winding in said transmitting unit and arranged to proportionately amplify the currents induced in said different legs, said amplifiers having output circuits which are coupled to different legs of the polyphase winding in said receiving unit, and torque-producing means effective upon said transmitting unit in response to an unbalance between mutually opposed forces developed between the rotor and stator windings of the receiving unit.

DE WITT RUGG GODDARD.